Dec. 23, 1952   R. K. ABRAMS   2,622,899
INDICATING AND RECORDING DEVICE
Filed Aug. 7, 1950

INVENTOR.
RUBY KATHRYN ABRAMS
BY
A. Yates Dowell
ATTORNEY

Patented Dec. 23, 1952

2,622,899

UNITED STATES PATENT OFFICE 2,622,899

INDICATING AND RECORDING DEVICE

Ruby Kathryn Abrams, Tampa, Fla., assignor of one-half to Robert Edwin McLeod, Tampa, Fla.

Application August 7, 1950, Serial No. 178,138

1 Claim. (Cl. 283—1)

This invention relates to equipment for use in indicating and recording certain special conditions and more particularly to an indicating and recording device for use in connection with certain abnormal physical conditions of humans.

Specifically, the invention relates to a device for use by one being or susceptible of being diabetic and for which a close check must be kept on the condition and treatment given, such a check being sometimes required or desirable as often as thrice per day.

Heretofore no particular equipment has been provided for indicating and recording and particularly in a specific or recognized manner and at regular time intervals. Also, equipment previously employed has been designed for the physician and not for use by the patient, where the need appears to be greatest.

Accordingly, it is an object of the invention to provide an indicating and recording device of simple and inexpensive construction which is easy to use and which will assist a patient in a day to day recognition of his actual condition and contribute to the treatment thereof.

Figure 1:
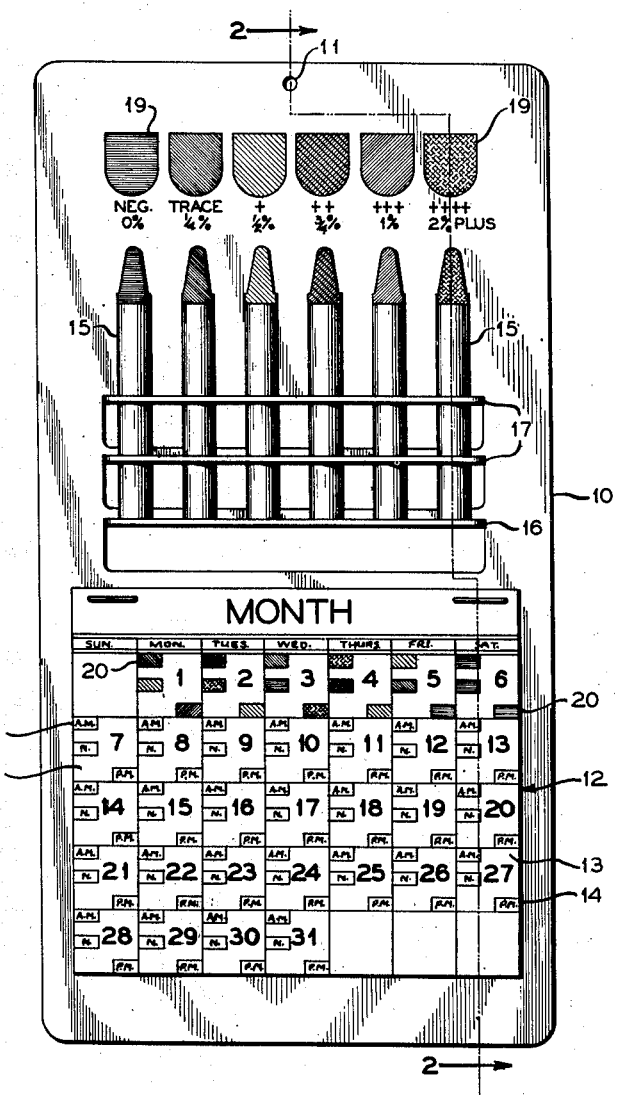
Figure 2:
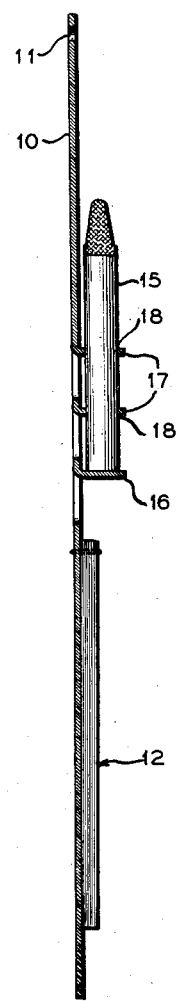

Further objects and advantages of the invention will be apparent from the following description taken in conjunction with the accompanying drawing, wherein:

Fig. 1 is a plan view illustrating one application of the invention;

Fig. 2, a section on the line 2—2 of Fig. 1; and

Figure 3:
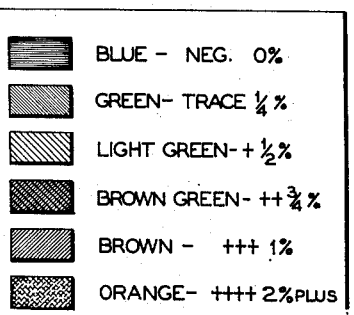

Fig. 3, a color chart for indicating the different colors of the preceding figures.

Briefly stated, the invention comprises a package unit of a relatively thin rigid sheet-like backing or base member with color indications and a chart or desirably a calendar as well as marking pencils corresponding and supported in proximity to such color indications so that the approximate results of a test can be indicated by referring to the color indications and a record of such indications thrice daily be recorded on said calendar. The calendar has specifically designated portions indicating morning, noon, and night for recordation of the indications corresponding to the color indications and the colored pencils are held in proximity to the color indicating means by means of a shelf and a pair of apertured shelf-like portions with receiving apertures in which the colored pencils are located. The structure provides a convenient device susceptible of use by the patient for keeping up to date and treating his condition as the same varies.

Referring now in detail to the drawing, there is shown, in Fig. 1, a backing or base member 10 which may be formed of cardboard, metal, plastic, or other desired material. This backing or base member is preferably rectangular and is provided with an aperture 11 adjacent one edge thereof to facilitate supporting the device on a hook or other member in position for convenient use.

Secured to the backing or base member 10 adjacent the lower portion thereof is a calendar 12 in which the spaces 13 for each day of the month are provided with boxes 14 bearing the indications "A. M., N., and P. M." to indicate morning, noon, and afternoon, the purpose of which will be presently described.

Directly above the calendar 12 is located a rack for supporting a plurality of colored crayons 15, the rack comprising an imperforate shelf-like member 16 formed by partially severing and bending outwardly a portion of the backing or base member 10 and directly above the shelf-like member 16 is a pair of outwardly extending members 17 which are provided with aligned apertures 18 for receiving the crayons 15. As clearly shown in Figs. 1 and 2, the crayons 15 extend through the apertures 18 and rest on the shelf 16 thus supporting the crayons in easily accessible and visible position.

Directly above the crayons 15 and located on the backing or base member 10 are a series of color spots 19 corresponding to the colors of the various crayons 15. Directly below the spots 19 is indicia indicating the value or meaning of each color.

As indicated above the device of this invention is intended to be used for recording the results of urinalysis when utilized in connection with patients having diabetes or with patients who are susceptible thereto. It will be understood that the urinalysis referred to is the commonly accepted standard test where a cuprous reagent is added to the specimen with the resulting color development indicated on the drawing and running through the following scale:

Blue—negative—0%
Green—trace—¼%
Light green—positive—½%
Brown green—positive—¾%
Brown—positive—1%
Orange—positive—2% plus This test and color chart is common knowledge in this art and forms no part of the instant invention, the corelation between color spots 19 and indicia recording crayons 15 being in strict accordance with this established gradation resulting from the reaction between reagent and specimen.

The notations below the color spots 19 indicate the amount of sugar in urine in accordance with the color thereof. The color of spots 19 are indicated by the color chart shown in Fig. 3, which chart forms no part of the invention, but is merely included in the drawing to indicate the actual colors of the spots 19.

In utilizing this device it is only necessary to obtain a sample of urine and to compare the color thereof with the color spots 19 and thereupon to utilize the appropriate crayon 15 to mark the box 14, as shown at 20 in accordance with the time of day, be it morning, noon or afternoon. This results in providing the patient with a convenient and easy manner of keeping a record and to provide such a record over a long period of time in order to check the patient's progress, as well as condition.

It will be obvious to those skilled in the art that various changes may be made in the invention without departing from the spirit and scope thereof and, therefore, the invention is not limited by that which is shown in the drawings and described in the specification, but only as indicated in the appended claim.

What is claimed is:

A recording device for indicating the urine-sugar content of a diabetic patient over a period of time as disclosed by repeated visual analysis, comprising a sheet-like base portion having a plurality of color indicia thereon ranging from the blue through the orange portion of the color spectrum, said colors corresponding to the standard reaction test employing a cuprous reagent with the urine specimen, a chart on said base identifying each of the color indicia disclosed by per centum of sugar content in the urine, spaced shelf portions on said base, retaining means associated with said shelf portions for engaging a plurality of marking devices, a marking device supported in each retaining means, the number of marking devices corresponding in number to the number of color indicia on said base, each of said marking devices being positioned in immediate association with a related color indicia and being capable of producing the identical color of said related color indicia, and an indicia receiving chart on said base for the reception of color markings from said marking devices whereby a charted record of urine-sugar content may be maintained of regularly repeated analyses of a diabetic patient's urine.

RUBY KATHRYN ABRAMS.

REFERENCES CITED

The following references are of record in the file of this patent:

UNITED STATES PATENTS

| Number | Name | Date |
|---|---|---|
| 570,408 | Jones | Oct. 27, 1896 |
| 689,667 | Blakeslee | Dec. 24, 1901 |
| 801,119 | Van Alstyne | Oct. 3, 1905 |
| 1,341,018 | Phillips | Mar. 25, 1920 |
| 1,425,513 | Donovan | Aug. 15, 1922 |
| 1,537,891 | Shedd | May 12, 1925 |
| 1,597,280 | Machauer | Aug. 24, 1926 |
| 2,285,214 | Lisle | June 2, 1942 |
| 2,487,275 | Seassau | Nov. 8, 1949 |